(12) United States Patent
Moeck (10) Patent No.: US 7,472,576 B1
(45) Date of Patent: Jan. 6, 2009

(54) NANOMETROLOGY DEVICE STANDARDS FOR SCANNING PROBE MICROSCOPES AND PROCESSES FOR THEIR FABRICATION AND USE

(75) Inventor: Peter Moeck, Portland, OR (US)

(73) Assignee: State of Oregon Acting By and Through The State Board of Higher Education On Behalf of Portland State University, Portland, OR (US)

( * ) Notice: Subject to any disclaimer, the term of this patent is extended or adjusted under 35 U.S.C. 154(b) by 440 days.

(21) Appl. No.: 11/282,395

(22) Filed: Nov. 17, 2005

Related U.S. Application Data (60) Provisional application No. 60/628,983, filed on Nov. 17, 2004.

(51) Int. Cl.
*B82B 1/00* (2006.01)
*B82B 3/00* (2006.01)
*G01B 21/00* (2006.01)
*G01N 13/10* (2006.01)
*G12B 21/00* (2006.01)

(52) U.S. Cl. .............. 73/1.75; 7/1.79; 7/1.89; 29/592; 977/701; 977/888

(58) Field of Classification Search .......... 73/1.75, 73/1.79, 1.89; 29/592, DIG. 105; 977/701, 977/888
See application file for complete search history.

(56) References Cited

U.S. PATENT DOCUMENTS

| | | | |
|---|---|---|---|
| 3,830,639 A | 8/1974 | Evans et al. | |
| 4,100,091 A | 7/1978 | Powell | |
| 4,267,507 A | 5/1981 | Guerpont | |
| 4,475,995 A | 10/1984 | Ziegler et al. | |
| 4,687,987 A | 8/1987 | Kuchnir et al. | |
| 4,966,952 A | 10/1990 | Riaza | |
| 5,070,004 A | 12/1991 | Fujita et al. | |
| 5,117,110 A | 5/1992 | Yasutake | |
| 5,194,161 A | 3/1993 | Heller et al. | |
| 5,223,409 A | 6/1993 | Ladner et al. | |
| 5,347,226 A | 9/1994 | Bachmann et al. | |
| 5,403,484 A | 4/1995 | Ladner et al. | |
| 5,504,366 A | 4/1996 | Weiss et al. | |

(Continued)

FOREIGN PATENT DOCUMENTS

CN 1209633 A 3/1999

(Continued)

OTHER PUBLICATIONS

Alchalabi et al., "Self-assembled semiconductor quantum dots with nearly uniform sizes," *Phys. Rev. Lett.* 90:026104.1-026104.4 (Jan. 2003).

(Continued)

*Primary Examiner*—Thomas P Noland
(74) *Attorney, Agent, or Firm*—Klarquist Sparkman, LLP (57) ABSTRACT

Nanometrology device standards and methods for fabricating and using such devices in conjunction with scanning probe microscopes are described. The fabrication methods comprise: (1) epitaxial growth that produces nanometer sized islands of known morphology, structural, morphological and chemical stability in typical nanometrology environments, and large height-to-width nano-island aspect ratios, and (2) marking suitable crystallographic directions on the device for alignment with a scanning direction.

17 Claims, 6 Drawing Sheets

U.S. PATENT DOCUMENTS

| | | | |
|---|---|---|---|
| 5,559,328 A | 9/1996 | Weiss et al. | |
| 5,578,745 A | 11/1996 | Bayer et al. | |
| 5,602,323 A * | 2/1997 | Ohmi | 73/1.79 |
| 5,605,800 A | 2/1997 | Kourilsky et al. | |
| 5,619,035 A | 4/1997 | Weiss et al. | |
| 5,652,428 A | 7/1997 | Nishioka et al. | |
| 5,665,905 A | 9/1997 | Bartha et al. | |
| 5,729,015 A * | 3/1998 | Tong | 250/306 |
| 5,760,901 A | 6/1998 | Hill | |
| 5,780,889 A | 7/1998 | Sethi | |
| 5,825,670 A | 10/1998 | Chernoff et al. | |
| 5,830,287 A | 11/1998 | Pinnow et al. | |
| 5,837,500 A | 11/1998 | Ladner et al. | |
| 5,855,827 A | 1/1999 | Bussing et al. | |
| 5,876,928 A | 3/1999 | Kourilsky et al. | |
| 5,905,000 A | 5/1999 | Yadav et al. | |
| 5,936,237 A | 8/1999 | van der Weide | |
| 5,948,972 A | 9/1999 | Samsavar et al. | |
| 5,955,661 A | 9/1999 | Samsavar et al. | |
| 5,959,241 A | 9/1999 | Sriram et al. | |
| 5,999,887 A | 12/1999 | Giannakopoulos et al. | |
| 6,016,693 A | 1/2000 | Viani et al. | |
| 6,028,008 A | 2/2000 | Bayer et al. | |
| 6,060,549 A | 5/2000 | Li et al. | |
| 6,066,806 A * | 5/2000 | Higashiura et al. | 174/110 R |
| 6,091,496 A | 7/2000 | Hill | |
| 6,146,390 A | 11/2000 | Heilbrun et al. | |
| 6,165,181 A | 12/2000 | Heilbrun et al. | |
| 6,214,368 B1 | 4/2001 | Lee et al. | |
| 6,230,572 B1 | 5/2001 | Pui et al. | |
| 6,237,029 B1 | 5/2001 | Master et al. | |
| 6,267,005 B1 | 7/2001 | Samsavar et al. | |
| 6,278,113 B1 | 8/2001 | Murayama et al. | |
| 6,337,215 B1 | 1/2002 | Wilson | |
| 6,354,133 B1 | 3/2002 | Yedur et al. | |
| 6,358,860 B1 | 3/2002 | Scheer et al. | |
| 6,374,135 B1 | 4/2002 | Bucholz | |
| 6,381,744 B2 | 4/2002 | Nanos et al. | |
| 6,387,560 B1 | 5/2002 | Yadav et al. | |
| 6,398,940 B1 | 6/2002 | Chi et al. | |
| 6,405,583 B1 | 6/2002 | Shirakawabe et al. | |
| 6,418,460 B1 | 7/2002 | Bitar et al. | |
| 6,434,687 B1 | 8/2002 | Huppenthal | |
| 6,459,482 B1 * | 10/2002 | Singh et al. | 356/243.1 |
| 6,463,319 B1 | 10/2002 | Bucholz | |
| 6,480,285 B1 | 11/2002 | Hill | |
| 6,490,913 B1 | 12/2002 | Martin et al. | |
| 6,491,702 B2 | 12/2002 | Heilbrun et al. | |
| 6,504,172 B2 | 1/2003 | Zagoskin et al. | |
| 6,520,005 B2 | 2/2003 | McWaid et al. | |
| 6,537,847 B2 | 3/2003 | Zagoskin et al. | |
| 6,544,698 B1 | 4/2003 | Fries | |
| 6,573,039 B1 | 6/2003 | Dunlay et al. | |
| 6,573,497 B1 | 6/2003 | Rangarajan et al. | |
| 6,573,498 B1 | 6/2003 | Rangarajan et al. | |
| 6,589,229 B1 | 7/2003 | Connelly et al. | |
| 6,591,658 B1 | 7/2003 | Yedur et al. | |
| 6,610,355 B2 | 8/2003 | Yadav et al. | |
| 6,611,039 B2 | 8/2003 | Anthony | |
| 6,616,895 B1 | 9/2003 | Dugas et al. | |
| 6,620,591 B1 | 9/2003 | Dunlay et al. | |
| 6,635,874 B1 * | 10/2003 | Singh et al. | 250/311 |
| 6,643,165 B2 | 11/2003 | Segal et al. | |
| 6,643,616 B1 | 11/2003 | Granik et al. | |
| 6,661,004 B2 | 12/2003 | Aumond et al. | |
| 6,689,650 B2 | 2/2004 | Gambino et al. | |
| 6,706,402 B2 | 3/2004 | Rueckes et al. | |
| 6,709,018 B2 | 3/2004 | Phillips | |
| 6,720,553 B2 | 4/2004 | Bonnell et al. | |
| 6,723,187 B2 | 4/2004 | Segal et al. | |
| 6,727,071 B1 | 4/2004 | Dunlay et al. | |
| 6,727,548 B1 | 4/2004 | King | |
| 6,731,531 B1 | 5/2004 | Forbes et al. | |
| 6,746,517 B2 | 6/2004 | Benson et al. | |
| 6,764,796 B2 | 7/2004 | Fries | |
| 6,768,918 B2 | 7/2004 | Zelenchuk | |
| 6,770,220 B1 * | 8/2004 | Klimant | 252/301.36 |
| 6,777,030 B2 | 8/2004 | Veerasamy et al. | |
| 6,784,028 B2 | 8/2004 | Rueckes et al. | |
| 6,870,309 B2 * | 3/2005 | Blyablin et al. | 313/310 |
| 7,062,397 B1 * | 6/2006 | Minor | 702/90 |
| 7,204,122 B2 * | 4/2007 | Sullivan et al. | 73/1.03 |
| 2001/0052122 A1 | 12/2001 | Nanos et al. | |
| 2002/0025277 A1 | 2/2002 | Dugas et al. | |
| 2002/0055033 A1 | 5/2002 | Yadav et al. | |
| 2002/0113971 A1 | 8/2002 | Zettler et al. | |
| 2003/0062590 A1 | 4/2003 | Anthony | |
| 2003/0080550 A1 | 5/2003 | Phillips | |
| 2003/0132376 A1 | 7/2003 | Bonnell et al. | |
| 2003/0222050 A1 | 12/2003 | Dugas et al. | |
| 2004/0029041 A1 | 2/2004 | Shih et al. | |
| 2004/0037253 A1 | 2/2004 | Boland et al. | |
| 2004/0065252 A1 | 4/2004 | Sreenivasan et al. | |
| 2004/0120858 A1 | 6/2004 | Dugas et al. | |
| 2004/0146430 A1 | 7/2004 | Dugas | |
| 2005/0010310 A1 * | 1/2005 | Touzov | 700/56 |

FOREIGN PATENT DOCUMENTS

| | | | |
|---|---|---|---|
| CN | 1409109 A | 4/2003 | |
| CN | 1434461 A | 8/2003 | |
| CN | 1440087 A | 9/2003 | |
| CN | 1440782 A | 9/2003 | |
| CN | 1470322 A | 1/2004 | |
| DE | 19651029 A1 | 6/1998 | |
| EP | 0957333 A1 | 11/1999 | |
| EP | 0736746 B1 | 3/2000 | |
| EP | 0676614 A1 | 6/2001 | |
| EP | 1251562 A1 | 10/2002 | |
| EP | 1298727 A2 | 4/2003 | |
| JP | 55155454 A2 | 12/1980 | |
| JP | 59057110 A * | 4/1984 | 73/1.79 |
| JP | 59057111 A * | 4/1984 | 73/1.79 |
| JP | 03122514 A2 | 5/1991 | |
| JP | 05018708 A2 | 1/1993 | |
| JP | 05164512 A2 | 6/1993 | |
| JP | 05223704 A2 | 8/1993 | |
| JP | 05312506 A2 | 11/1993 | |
| JP | 06066512 A2 | 3/1994 | |
| JP | 06117844 A2 | 4/1994 | |
| JP | 06201372 A2 | 7/1994 | |
| JP | 06201374 A2 | 7/1994 | |
| JP | 07083650 A2 | 3/1995 | |
| JP | 07248332 A2 | 9/1995 | |
| JP | 08005313 A2 | 1/1996 | |
| JP | 08087701 A2 | 4/1996 | |
| JP | 08233836 A2 | 9/1996 | |
| JP | 08262037 A2 | 10/1996 | |
| JP | 08278315 A2 | 10/1996 | |
| JP | 09145722 A2 | 6/1997 | |
| JP | 11094862 A2 | 4/1999 | |
| JP | 11304822 A2 | 11/1999 | |
| JP | 2002122529 A2 | 4/2002 | |
| JP | 2002323429 A2 | 11/2002 | |
| JP | 2002350319 A2 | 12/2002 | |
| JP | 2003042928 A2 | 2/2003 | |
| JP | 2003162954 A2 | 6/2003 | |
| JP | 2004037325 A2 | 2/2004 | |
| RU | 2179704 C2 | 2/2002 | |
| WO | WO9908785 A2 | 2/1999 | |
| WO | WO9935600 A2 | 7/1999 | |
| WO | WO9946558 A1 | 9/1999 | |
| WO | WO0070297 A3 | 11/2000 | |
| WO | WO0106227 A2 | 1/2001 | |

| WO | WO0205304 | 1/2002 |
| WO | WO03019238 | 3/2003 |
| WO | WO03105184 | 12/2003 |
| WO | WO03107433 | 12/2003 |
| WO | WO2004035211 | 4/2004 |
| WO | WO04053860 | 6/2004 |
| WO | WO2004050237 | 6/2004 |
| WO | WO04055786 | 7/2004 |

OTHER PUBLICATIONS

Ferreira et al., "AFM characterization of PbTe quantum dots grown by molecular beam epitaxy under Volmer-Weber mode," *J. Cryst. Growth* 231:121-128 (2001).

Griffith and Grigg, "Dimensional metrology with scanning probe microscopes," *J. Appl. Phys.* 74(9):R83-R109 (Nov. 1993).

Keller and Franke, "Envelope reconstruction of probe microscope images," *Surface Science* 294:409-419 (May 1993).

Lüders et al., "Self-organized structures in $CoCr_2O_4$ (001) thin films: Tunable growth from pyramidal clusters to a {111} fully faceted surface," *Phys. Rev.* B 70:045403.1-045403.6 (Jul. 2004).

Pinczolits et al., "Direct formation of self-assembled quantum dots under tensile strain by heteroepitaxy of PbSe on PbTe (111)," *Appl. Phys. Lett.* 73(2):250-252 (Jul. 1998).

Pinczolits et al., "Molecular beam epitaxy of highly faceted self-assembled IV-VI quantum dots with biomodal size distribution," *J. Cryst. Growth* 201/202:1126-1130 (1999).

Raab et al., "Atomic Force Microscopy and Transmission Electron Microscopy Study of Self-Organized Ordering in Vertically Aligned PbSe Quantum Dot Superlattices," *Mat. Res. Symp. Proc.* 696:N7.2.1-N7.2.6 (2002).

Springholz et al., "Dot size dependence of vertical and lateral ordering in self-organized $PbSe/Pb_{1-x}Eu_xTe$ quantum-dot superlattices," *App. Phys. Lett.* 82:799-801 (Feb. 2003).

Springholz et al., "Self-Organized Growth of Three Dimensional Quantum-Dot Crystals with fcc-Like Stacking and a Tunable Lattice Constant," *Science* 282:734-737 (Oct. 1998).

Springholz et al., "Tuning of Vertical and Lateral Correlations in Self-Organized $PbSe/Pb_{1-x}Eu_xTe$ Quantum Dot Superlattices," *Phys. Rev. Lett.* 84:4669-4672 (May 2000).

Springholz et al., Self-organized ordering in self-assembled quantum dot superlattices, *Materials Science and Engineering* 88:143-152 (2002).

Stangl et al., "Structural properties of self-organized semiconductor nanostructures," *Rev. Mod. Phys.* 76:725-783 (Jul. 2004).

Springholz et al., "Controlling of lateral and vertical order in self-organized PbSe quantum dot superlattices," *Proc. 25th Int. Conf. on the Physics of Semiconductors*, Sep. 2000, Osaka, Japan, Miura and Ando, eds. (Springer 2001), p. 355-358.

Wang et al., "Size, shape, and stability of InAs quantum dots on the GaAs(001) substrate," *Physical Review* B 62:1897-1904 (Jul. 2000).

* cited by examiner

FIG. 5
STEP HEIGHT
20-25 nm ±1 nm
3.0 μm

NANOMETROLOGY DEVICE STANDARDS FOR SCANNING PROBE MICROSCOPES AND PROCESSES FOR THEIR FABRICATION AND USE

CROSS REFERENCE TO RELATED APPLICATIONS

This application claims the benefit of U.S. Provisional Application 60/628,983, filed Nov. 17, 2004 and that is incorporated herein by reference.

FIELD

The disclosure pertains to nanometrology device standards.

BACKGROUND AND SUMMARY

With the advent of science and engineering on the nanometer scale, scanning probe microscopes are increasingly used for nanometrology applications. Scanning probe microscopes use various probe tip configurations for assessing a range of physical properties on the atomic and nanometer scale. Based on the physical detection principle, a scanning probe microscope can be referred to as a scanning tunneling microscope, an atomic force microscope, a magnetic force microscope, or other type of microscope. The availability of these various configurations has permitted a wide range of nanometer scale measurements.

One particular application of scanning probe microscopy is in the measurement and characterization of specimen topography. However, accurate specimen metrology requires dimensional standards and standardized procedures for calibration. An absolute length reference is typically unavailable on a sample of interest, and nanometrology device standards are needed. Conventional "top-down" approaches for fabricating length references are based on conventional semiconductor manufacturing lithographic and etching processes. However, these processes are suitable for reference standards having feature heights greater than about 20 nm and feature pitches greater than about 1 µm, and smaller feature sizes are unavailable.

In many applications, interactions of a scanning probe tip and a sample are complex, and measurements of sample topography are complicated by the finite size of the scanning probe tip. See, for example, J. G. Griffith and D. A. Grigg, "Dimensional metrology with scanning probe microscopes," J. Appl. Phys. 74, R83 (1993) and D. J. Keller and F. S. Franke, "Envelope reconstruction of probe microscope images," Surface Science 294, 409 (1993). Accurate microscope calibration could permit deconvolution of the effects of finite probe tip size from specimen measurements.

Figure 1:
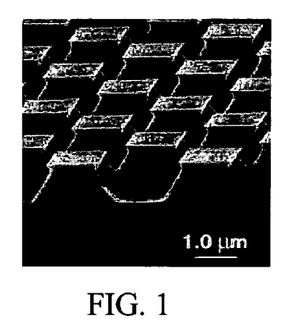
FIG. 1 is a scanning electron microscopy image of a conventional nanometrology device standard.
Figure 2:
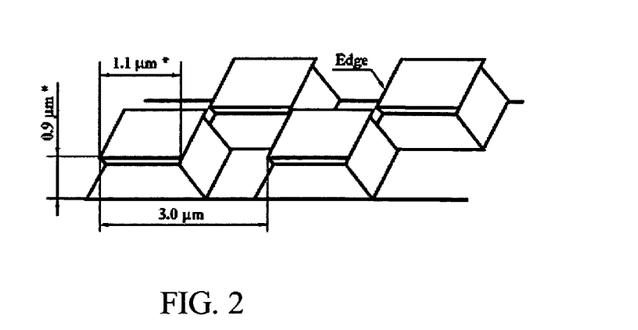
FIG. 2 is a representation of a conventional nanometrology device standard. Dimensions noted with asterisks are given for information only and are not intended to serve as standards.
Figure 3A:
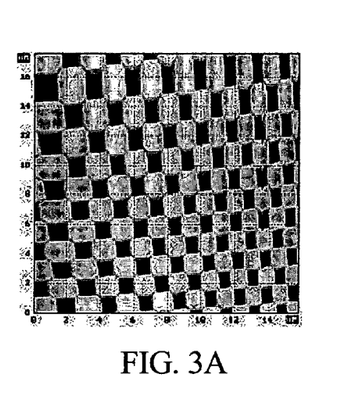
FIGS. 3A-3B are scanning probe microscopy images of the nanometrology device standard of FIG. 1 before (FIG. 3A) and after (FIG. 3B) correction of lateral nonlinearity. The images correspond to an area of about 400 $\mu m^2$.
Figure 3B:
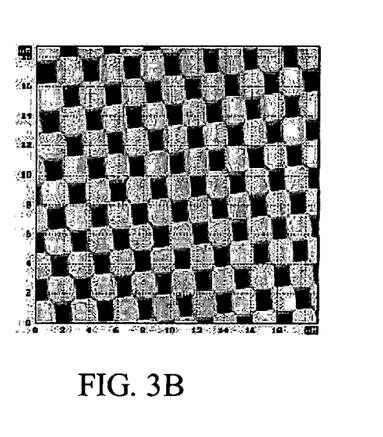

FIGS. 1, 2, and 3A-3B illustrate a typical lithographically produced nanometrology device standard and microscope calibration based on such a device standard. Using such a device, a microscope can be calibrated for lateral dimensional measurements, and lateral non-linearity, hysteresis, creep, and cross-coupling effects can be identified and compensated. FIGS. 1-2 illustrate a conventional silicon calibration grating that includes a chessboard-like array of square pillars with sharp undercut edges formed by (110) planes of silicon. Step heights are on the order of 1 µm and the pitch is on the order of a few µm, wherein the pitch is generally accurate to within ±7.5 nm. The edge curvature is less than 5 nm. FIGS. 3A-3B illustrate scanning probe microscopy images before and after lateral scan nonlinearities are corrected, respectively, based on a nanometrology standard such as that illustrated in FIGS. 1-2.

Figure 4:
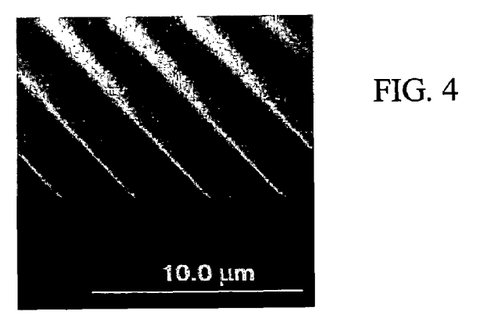
FIG. 4 is a scanning electron microscopy image of a conventional nanometrology device standard.
Figure 5:
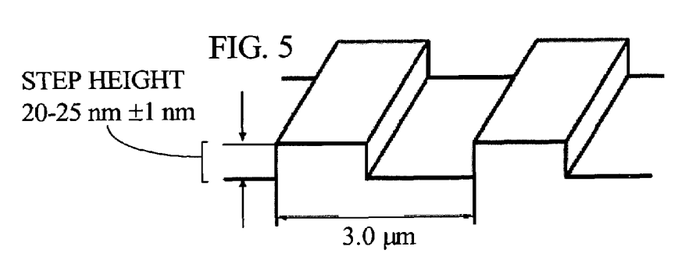
FIG. 5 is a schematic diagram of a conventional nanometrology device standard. Dimensions noted with an asterisk are listed for information only and are do not generally serve as reference standards.

FIGS. 4-5 illustrate a conventional "top-down" nanometrology standard for vertical calibrations. This standard includes a quasi-one-dimensional array of rectangular $SiO_2$ steps that are 20 to 25 nm high and that are formed on a silicon wafer. The area of this standard is about 9 $mm^2$. Step height is typically accurate to about ±1 nm. The array is generally coated with $Si_3N_4$ to prevent Si from oxidation. Vertical calibration and linearity corrections are typically based on several such devices with different nominal step heights such as, for example, 22.5 nm, 100 nm, 500 nm, 1000 nm, and 1500 nm.

Figure 6A:
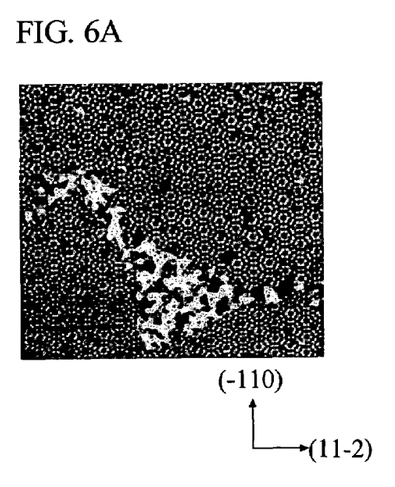
FIG. 6A is a two dimensional scanning tunneling microscopy image of a reconstructed surface of (111) oriented silicon. Image area is about 4900 $nm^2$.
Figure 6B:
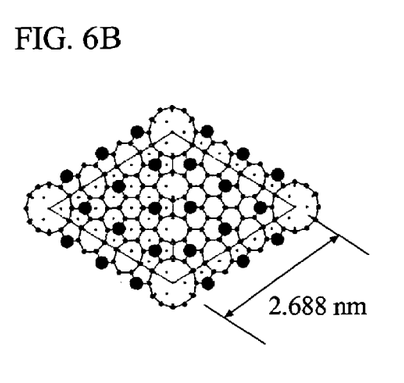
FIG. 6B is a schematic diagram illustrating an atomic arrangement of reconstructed (111) oriented silicon such as shown in FIG. 6A.
Figure 7:
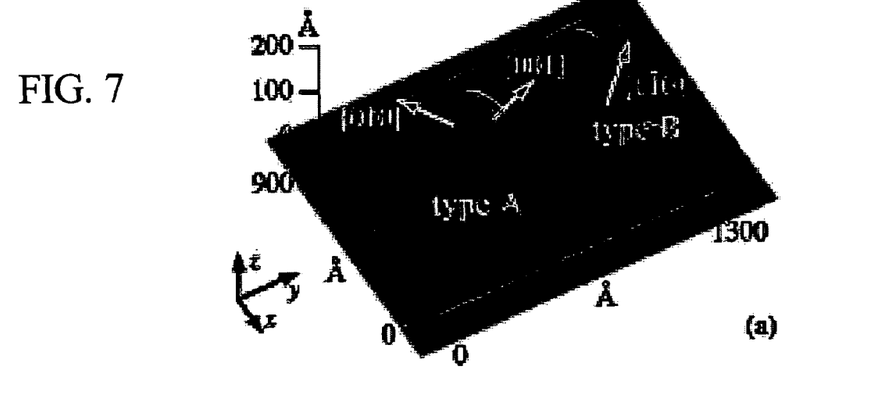
Figure 8:
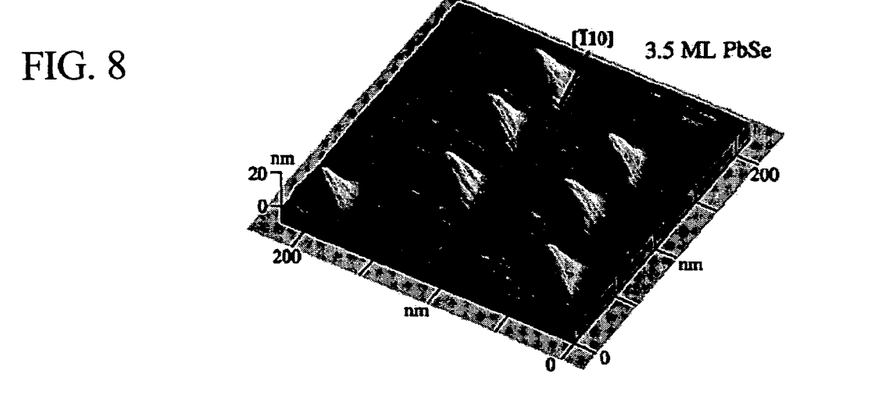
FIG. 8 is a 3D atomic force microscopy image of PbSe nano-islands on (111) oriented PbTe (modified after Pinczolits et al., Appl. Phys. Lett. 73, 250 (1998)). The nano-island height is approximately 16.5 nm, the shape is that of trigonal pyramids with {100} facets. The nano-island aspect ratio (height to half-base width in the [-1-12], [-12-1], and [2-1-1] directions) is approximately $\sqrt{2}$. Nano-island density is approximately 100 $\mu m^{-2}$.
Figure 9:
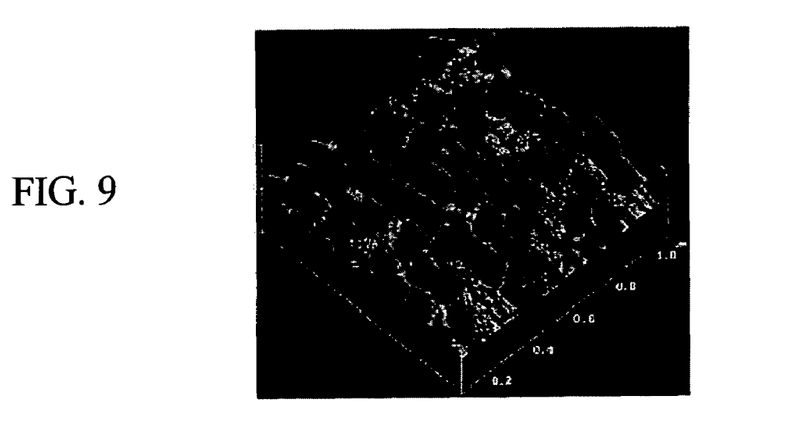
FIG. 9 is a 3D atomic force microscopy image of PbSe nano-islands on (111) oriented PbTe (after Alchalabi et al., Phys. Rev. Lett. 90, 26104 (2003)). Nano-island height is approximately 19 nm, and nano-island shape is that of trigonal pyramids with {100} facets. Nano-island aspect ratio (height to half-base width in the [-1-12], [-12-1] and [2-1-1] directions) is approximately/2. Nano-island density is approximately 120 $\mu m^{-2}$.

Since scanning tunneling microscopes (and special atomic force microscopes that operate in vacuum) can have resolution on an atomic scale, reference samples of inorganic crystalline materials having known lattice constants can be used as lateral calibration standards. For example, highly ordered pyrolytic graphite can be used. In a [0001] oriented graphite crystal, the lateral lattice constant, i.e. the length of the <1000> and <1100> lattice vectors can be measured directly and is known to be 0.2462 nm. A single atomic monolayer step of graphite is known to be 0.3354 nm high. Thus, multilayer steps must have heights that are integral multiples of this monolayer step height. Such single- and multilayer steps can be used for vertical calibrations of scanning probe microscopes. Standards based on other inorganic crystals can also be used to obtain lateral and vertical calibrations of less than about 1 nm. For example, a Si(111) surface such as illustrated in FIG. 6 can be used. This surface has a lateral period of 2.688 nm.

Thus, nanometrology device standards can be obtained that are suitable for calibrations from atomic dimensions up to a few nm. There is, however, a gap between these atomic precision nanometrology device standards and the about 20 nm dimensions of nanometrology device standards that are produced by the top-down approach. Accordingly, improved device standards and methods are needed.

SUMMARY

According to representative examples, calibration standards comprise a substrate and at least one nano-island situated at a surface of the substrate. An indicia associated with a crystallographic orientation of the at least one nano-island is fixed with respect to the nano-island. In some examples, the indicia is situated on the substrate or at the at least one crystal island. In additional examples, the calibration standards comprise a plurality of nano-islands. The indicia can be associated with a cleavage plane of the substrate or the nano-island. In representative embodiments, the substrate is (111) oriented silicon or (111) oriented $BaF_2$, and a buffer, stress relief, or other layer is situated between the substrate and the at least one nano-island. In typical examples, the nano-island has dimensions of between about 2 nm and 20 nm.

Methods of fabricating a calibration standard comprise forming at least one nano-island at a surface of a substrate and providing an indicia of a crystallographic orientation of the nano-island, wherein the indicia is fixed with respect to the nano-island. In some examples, the indicia is provided by cleaving at least one of the substrate and the nano-island. In other examples, the indicia is based on X-ray diffraction analysis of the nano-island or is based on electron backscatter diffraction. In representative examples, the at least one nano-island is formed by epitaxial growth and has dimensions of between about 2 nm and 10 nm. In further examples, a plurality of nano-islands is formed at the surface of the substrate.

Methods comprise evaluating a nano-island with a scanning probe microscope, and calibrating the scanning probe microscope based on the evaluation. In representative examples, the calibration is associated with compensation of a scan nonlinearity. In additional examples, methods further comprise selecting a hardness of the nano-island based on a scanning probe hardness and evaluating a plurality of nano-islands of at least two different heights with the scanning probe microscope, wherein the scanning probe microscope is calibrated based on the evaluation.

The foregoing and other objects, features, and advantages of the technology will become more apparent from the following detailed description, which proceeds with reference to the accompanying figures.

BRIEF DESCRIPTION OF THE DRAWINGS

FIG. 7 is a 3D atomic force microscopy image of PbSe nano-islands on (111) oriented PbTe for nanometrology (modified after M. Pinczolits et al., J. Cryst. Growth 201-202, 1126 (1999)). The height of the larger nano-islands (type A) is approximately 16.5 nm, and the height of the two smaller nano-islands (type B) is about 10 nm. The shape of all three nano-islands is that of trigonal pyramids with {100} facets. The nano-island aspect ratio (height to half-base width in the [-1-12], [-12-1], and [2-1-1] directions) is approximately $\sqrt{2}$. The corresponding angle between the (111) surface normal and the (100), (010) and (001) facets is approximately 57.74°. The angle between the [2-1-1] and the [100] direction is approximately 35.26°. The total nano-island density is approximately 100 $\mu m^{-1}$.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" means electrically or electromagnetically connected or linked and does not exclude the presence of intermediate elements between the coupled items.

Disclosed below are representative embodiments of metrology standards and associated methods of fabrication and use. The described systems, apparatus, and methods should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Disclosed herein are standards and associated methods of fabrication and use based on a "bottom-up" approach. Naturally occurring self-assembly and ordering processes can be used to produce well defined structures that have known feature sizes and morphologies of nm size in three dimensions. Epitaxial self-assembly of nanometer sized islands, referred to herein as nano-islands, can produce suitable nanometrology device standards. Self assembly of nano-islands is described in Alchalabi et al., "Self-assembled semiconductor quantum dots with nearly uniform sizes," Phys. Rev. Lett. 90, 26104 (2003), Ferreira et al., "AFM characterization of PbTe quantum dots grown by molecular beam epitaxy under Volmer-Weber mode," J. Cryst. Growth 231, 121 (2001), Lüders et al., "Self-organized structures in $CoCr_2O_4$ (001) thin films: Tunable growth from pyramidal clusters to a {111} fully faceted surface," Phys. Rev. B 70, 45403 (2004), Pinczolits et al., "Direct formation of self-assembled quantum dots under tensile strain by heteroepitaxy of PbSe on PbTe (111)," Appl. Phys. Lett. 73, 250 (1998), Raab et al., "Atomic Force Microscopy and Transmission Electron Microscopy Study of Self-Organized Ordering in Vertically Aligned PbSe Quantum Dot Superlattices," Mat. Res. Symp. Proc. Vol. 696, N7.2.1 (2002), Pinczolits et al., "Molecular beam epitaxy of highly faceted self-assembled IV-VI quantum dots with bimodal size distribution," J. Cryst. Growth 201-202, 1126 (1999), Springholz et al., "Self-Organized Growth of Three-Dimensional Quantum-Dot Crystals with fcc-Like Stacking and a Tunable Lattice Constant," Science 76, 1675 (1996), Springholz et al., "Tuning of Vertical and Lateral Correlations in Self-Organized $PbSe/Pb_{1-x}Eu_xTe$ Quantum Dot Superlattices," Phys. Rev. Lett. 84, 4669 (2000), Springholz et al., "Controlling of lateral and vertical order in self-organized PbSe quantum dot superlattices," Proc. 25th Int. Conf. on the Physics of Semiconductors, September 2000, Osaka, Japan, Miura and Ando, eds. (Springer 2001), p. 355-358, Springholz et al., Self-organized ordering in self-assembled quantum dot superlattices," Materials Science and Engineering B 88, 143-152 (2002), Springholz et al., "Dot size dependence of vertical and lateral ordering in self-organized $PbSe/Pb_{1-x}Eu_xTe$ quantum-dot superlattices," App. Phys. Lett. 82, 799 (2003), and Stangl et al., "Structural properties of self-organized semiconductor nanostructures," Rev. Mod. Phys. 76, 725 (2004).

Nano-islands have several characteristics that make them particularly suitable for metrological standards. Nano-island morphology is known, stable, and uniform so that sample topography/scanning tip deconvolutions can be calculated. Nano-islands have structural, morphological, and chemical stability in typical nanometrology laboratory environments. Nano-islands have morphological uniformity that is largely independent of nano-island height since the nano-island facets are the crystallographic net-planes with the lowest or a very low surface energy (except for very small heights). In addition, nano-islands have large height-to-width aspect ratios so that elastic lattice mismatch strain resulting from the heteroepitaxial growth in the Stranski-Krastanow or Volmer-Weber mode tends to be partly relieved. Nano-islands can be produced with wide or narrow size distributions, and within hardness ranges that allow calibrations with scanning tips of different hardnesses. In order to use nano-islands as calibration standards, indicia that are detectable either macroscopically or microscopically can be provided to indicate crystallographic alignment of the nano-islands with respect to, for example, a scanning direction of a scanning probe microscope. In addition, aspect ratios, dimensions, size distributions, or other characteristics can be provided.

Application of nanometrology device standards to scanning probe microscopy can be achieved by calibrating, correcting, and fine tuning the scanning probe microscope with a nanometrology device standard until a measurement of the standard yields a value or values identical or sufficiently close to the dimensions or other values that are certified for the standard. In some examples, nanometrology device standards described herein are associated with fixed angles between a sample surface and nano-island facets, and these angles can be used for calibration.

Representative examples of nanometrology device standards for scanning probe microscopes, processes for the fabrication of such standards, and use of the standards are described. Generally speaking, the representative standards consist of epitaxial structures with nano-islands that possess either three symmetrically equivalent {100} facets on a (111) oriented substrate (referred to herein as "type 1"), four symmetrically equivalent {111} facets on a (001) oriented substrate ("type 2"), or three symmetrically equivalent {112} facets on a (111) oriented substrate ("type 3"). In all cases, there can also be tiny top facets more or less parallel to the surface normals of the substrate, a variety of free surface reconstructions or a slight rounding of the intersection points of the above mentioned {100}, {111}, and {112} facets. The nano-islands are of single crystalline materials and are chemically, structurally, and morphologically stable. Nano-islands that are of a material that occurs naturally as a mineral will also generally be stable in the nano-metrology laboratory environment.

One suitable process for nanometrology device standard fabrication is heteroepitaxial self-assembly in either the Stranski-Krastanow or the Volmer-Weber growth mode combined with processes that indicate the relevant crystallographic directions of the nano-islands. Such indications can be configured to be visible either macroscopically or microscopically. Crystallographic orientations can be revealed by, for example, partial or complete cleaving of (111) oriented substrates having rock salt or diamond structure. Alternatively, standard X-ray crystallographic or electron backscattering diffraction identification and marking of low-indexed crystallographic directions that are perpendicular to the surface normal can be used with substrates having the spinel structure or other structures that do not cleave well.

Substrates that are particularly suitable for nano-island self assembly include (111) (type 1 and 3) or (001) (type 2) oriented single crystals of the cubic crystal system having, for example, diamond, rock salt, or spinel structure. While cubic nano-islands on (111) oriented substrates tend to have three symmetrically equivalent {100} (type 1) or three symmetrically equivalent {112} facets (type 3), their counterparts on (001) oriented substrates have four symmetrically equivalent {111} facets (type 2).

Type 1 nano-islands can be grown in the Stranski-Krastanow growth mode to produce representative nano-islands as shown in FIGS. 7-10. Such nano-islands have nano-island aspect ratios (i.e., height to half-base width ratio in the three symmetrically equivalent [2-1-1], [-12-1] and [-1-12] directions) of approximately $\sqrt{2}$. The height to the full-base width ratio for type 1 nano-islands is approximately $\sqrt{2/3}$ or about 0.4714. These high-aspect ratio nano-islands exhibit their facetted equilibrium form for all but the smallest island heights. The rather high aspect ratio of these islands results from the 54.736° angle between {111} and {100} planes, and tends to provide relief of elastic mismatch strain energy due to relaxation of the crystal lattice of the upper part of the nano-islands. These nano-island are thus thermodynamically (structurally, chemically, and morphologically) stable at all but the smallest heights in typical laboratory environments and can have either a narrow size distribution (within approximately 2-25%) or a broad size distribution.

Figure 11:
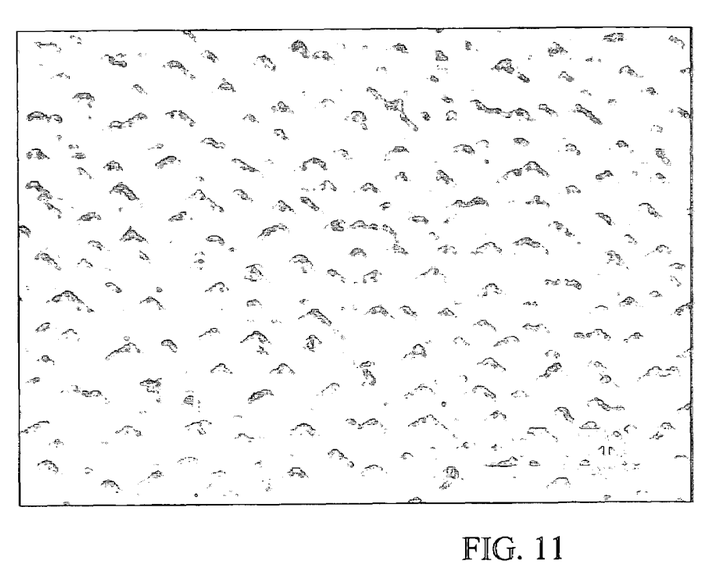
FIG. 11 is a scanning electron microscopy image of $CoCr_2O_4$ islands on (001) oriented $MgAl_2O_4$ (after Lüders, et al., Phys. Rev. B 70, 45403 (2004)). The island size distribution is bimodal, with nano-islands having heights smaller than about 50 nm and micro-islands having heights as great as about 500 nm. The shape of the nano-islands is that of tetragonal pyramids with {111} facets so that there is a nano-island aspect ratio (height to half-base width in the [110], [1-10], [-1-10], and [-110] directions) of approximately $\sqrt{2}$. The combined nano-island density is approximately 5 $\mu m^{-2}$.

Type 2 nano-islands such as shown in FIG. 11 have a nano-island aspect ratio (i.e. height to half-base width ratio in the four symmetrically equivalent [110], [1-10], [-1-10], and [-110] directions) of approximately $\sqrt{2}$. The height to the full-base width ratio is approximately $\sqrt{2}^{-1}$ for type 2 nano-islands, or roughly 0.7071. These high-aspect ratio nano-islands possess their facetted equilibrium form for all but the smallest island heights. The extremely high aspect ratio of these nano-islands results from the 54.736° angle between {100} and {111} planes, and ensures that there is relief of elastic mismatch strain energy due to relaxation of the crystal lattice of the upper part of the nano-islands. Such nano-islands are thus thermodynamically stable at all but the smallest island heights in a typical nanometrology laboratory environments. Generally, such nano-islands can be formed with a broad distribution of sizes.

Figure 12:
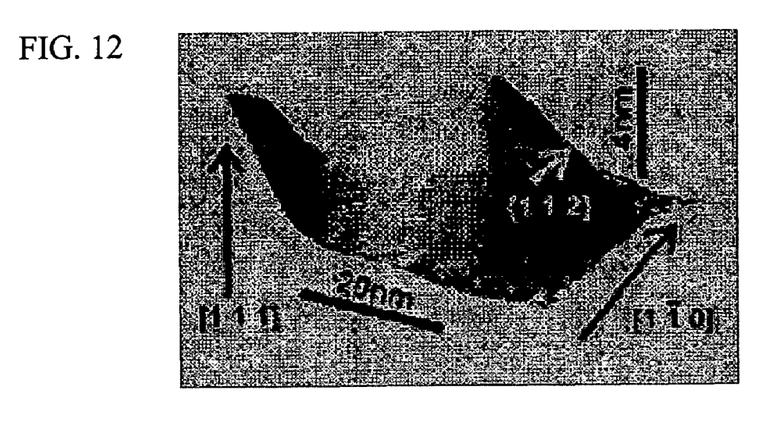
FIG. 12 is a 3D atomic force microscopy image of a single PbTe nano-island on (111) oriented $BaF_2$ (after Ferreira et al., J. Cryst. Growth 231, 121 (2001)). Nano-island height is approximately 4 nm. Nano-island shape is that of trigonal pyramids with {211} facets so that there is a nano-island aspect ratio (height to half-base width in the [-1-12], [-12-1], and [2-1-1] directions) of approximately 0.3536. Nano-island density is approximately 120 $\mu m^{-2}$.

Type 3 nano-islands such as shown in FIG. 12 exhibit a nano-island aspect ratio (i.e. height to half-base width ratio in the three symmetrically equivalent [2-1-1], [-12-1], and [-1-12] directions) of approximately $\arccos(2/\sqrt{6}\cdot\sqrt{3})\approx 0.3536$. The height to full-base width ratio is approximately 0.1179 for type 3 nano-islands. The relatively high aspect ratio of these nano-islands result from the 19.471° angle between {111} and {112} planes, and ensures that there is a sufficient relief of elastic mismatch strain energy due to relaxation of the crystal lattice of the upper part of the nano-islands for the {112} planes to be stable. These nano-island are thus thermodynamically stable at all but the smallest island heights in typical nanometrology laboratory environments.

Type 1, 2 and 3 nanometrology device standards can be used in calibration of scanning probe microscopes. Typical number densities of nano-islands are in a range of from 1 to 500 $\mu m^{-2}$. These number densities can generally be selected to provide spacing between nano-islands so that height measurements (z-coordinates) based on a particular nano-island are substantially independent of adjacent nano-islands. Typical nano-island heights are in a range of from about 1 nm to 500 nm. Height measurements in scanning probe microscopes are intrinsically more sensitive than x- and y-measurements and can be calibrated by standards with a certified roughness. Over the known large nano-island aspect ratios and height to full-base width ratios, this height sensitivity can be used for the calibration of lateral measurements.

Figure 10A:
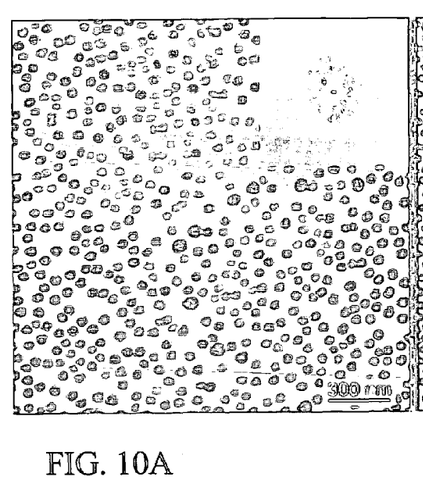
FIGS. 10A-10B are 2D atomic force microscopy images of a single PbSe nano-island layer (FIG. 10A) and of a last layer of a sixty-period PbSe/(Pb,Eu)Te superlattice on (111) oriented PbTe (FIG. 10B), respectively. The figure inserts show 2D power spectra of the atomic force microscopy images that indicate the hexagonal ordering of the dots of FIG. 10B. Nano-island density is approximately 170 $\mu m^{-2}$ for the single PbSe layer, and approximately 295 $\mu m^{-2}$ for the top PbSe layer of the sixty-period PbSe/(Pb,Eu)Te superlattice.
Figure 10B:
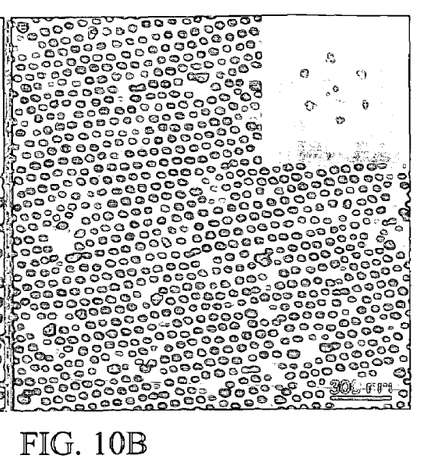

Since the shapes of type 1, 2 and 3 nano-islands are known, scanning tip shape/nano-island shape deconvolutions can be calculated to determine the shape of a scanning probe tip. With the shape of the scanning probe tip determined in this way, deconvolutions of the finite probe tip size from measurements of nanometer-sized objects of interest can be calculated in order to better estimate actual object shapes and sizes. Using nanometrology device standards that feature laterally ordered arrays of nano-islands such as illustrated in FIG. 10B, further calibrations of scanning probe microscopes such as, for example, the removal of non-linearities in x- and y-scanning, can be achieved. In summary, very accurate calibrations of scanning probe microscopes can be achieved with the help of the above described type 1, 2, and 3 nanometrology device standards.

In order to provide such nanometrology standards, particularly those that can fill the gap between the atomic precision nanometrology standards that allow calibrations up to a few nm, and conventional "top down" nanometrology device standards that allow calibrations down to about 20 nm, so-called "bottom-up approaches" are described. These "bottom up" approaches can be used to provide standards suitable for a wide range of dimensions but are particularly needed for dimensional calibrations for which atomic precision standards are too small, and "top down" standards are too large. Representative examples of such standards are described below.

Epitaxial self-assembly of PbSe (clausthalite) or Pb(Se,Te) with high PbSe content islands on PbTe (altaite) in the Stranski-Krastanow mode leads to nanometer sized three-dimensional islands that possess suitable properties for nanometrology device standard applications. Epitaxial self-assembly of $CoCr_2O_4$ (cochromite) islands on $MgAl_2O_4$ (spinel) substrates produces nanometer sized three-dimensional islands that also have suitable properties for nanometrology applications. Epitaxial self-assembly of PbTe (altaite) in the Volmer-Weber mode produces nanometer sized three-dimensional islands that also have suitable properties for nanometrology device standard applications.

Other epitaxial materials systems can also be used to produce nanometer sized three-dimensional islands that have suitable properties for nanometrology device standard applications. While PbSe and PbTe possess a Mohs hardness of 2.5, $CoCr_2O_4$ is much harder, having a Mohs hardness of 7. All three types of nanometrology device standards can, thus, be used in different scanning probe modes and with scanning probe tips of different harnesses.

The self-assembly of nano-islands is a result of the epitaxial growth mode. One of many examples of the first type of the device is a wafer of (111) oriented $BaF_2$ (frankdicksonite) substrate on which firstly a lattice matched Pb(Se,Te) buffer layer or a PbTe buffer layer and secondly either a PbSe or Pb(Se,Te) nano-island layer with high PbSe content are grown epitaxially by means of molecular beam epitaxy or metal organic vapor phase epitaxy in the Stranski-Krastanow mode. The final PbSe or Pb(Se,Te) nano-island layer may be replaced by a strain symmetrized superlattice of several PbSe or Pb(Se,Te) nano-island layers with high PbSe content separated by (Pb,Eu)(Se,Te) spacer layers with a high PbTe content that ends in nano-islands. These multilayer superlattices can also be grown epitaxially by the same methods. The process of the fabrication of this device comprises epitaxial growth and the introduction of macroscopically or microscopically visible edges parallel to <110> directions that are perpendicular to the wafer normal by partial or total cleaving of the pseudo-substrate while taking advantage of the three naturally occurring {111} cleavage planes that are inclined by 70.529° to the (111) $BaF_2$ plane.

For scanning probe microscope calibration, the nano-islands of this nanometrology device standard are aligned with their <110> edges (the intersections of the nano-island facets with the $BaF_2$ wafer normal) perpendicular to the scanning direction. This is achieved by taking advantage of the macroscopically or microscopically visible <110> direction markers. When the scanning probe tip scans over such a nano-island, it follows a [2-1-1], [1-21] or [11-2] direction. First the scanning probe tip goes up a nano-island (100), (010), or (001) plane. Each of these planes makes an angle of 54.736° with the (111) surface normal. Then the scanning probe tip goes down a nano-island [-100], [0-10], or [00-1] edge. Each of these edges makes an angle of 32.264° with the (111) surface normal. The three-fold symmetry of the nano-island is taken advantage of for the microscope calibration by adjusting each one of the above mentioned <110> directions to be perpendicular to the scanning direction, one after the other, repeating the calibration procedure three times, and averaging the results.

Another of many examples of the first type of the device is a wafer of (111) oriented Si substrate on which firstly a $CaF_2$ (fluorite) buffer layer, secondly a $BaF_2$ buffer layer, thirdly a lattice matched Pb(Se,Te) buffer layer or a PbTe buffer layer, and fourthly either a PbSe or Pb(Se,Te) nano-island layer with high PbSe content or a strain symmetrized superlattice of several PbSe or Pb(Se,Te) nano-island layers with high PbSe content separated by (Pb,Eu)(Se,Te) spacer layers with a high PbTe content are grown epitaxially by molecular beam epitaxy or metal organic vapor phase epitaxy. The fabrication of this device comprises epitaxial growth and the introduction of macroscopically or microscopically visible edges parallel to <112> directions that are perpendicular to the wafer normal by either partial or complete cleavage of the pseudo-substrate while taking advantage of the three naturally occurring {110} cleavage planes that are inclined by 90° to the (111) nanometrology device surface.

For microscope calibration, the nano-islands of this nanometrology device standard are aligned with their <110> edges (the intersections of the nano-island facets with the Si wafer normal) perpendicular to the scanning direction. This is achieved by taking advantage of the macroscopically or microscopically visible <112> directions. The three-fold symmetry of the nano-island is taken advantage of by adjusting each one of the above mentioned <110> directions to be perpendicular to the scanning probe direction, one after another, repeating the calibration procedure three times, and averaging the results.

One of many examples of the second type of the device is a wafer of (100) oriented $MgAl_2O_4$ (spinel) on which $CoCr_2O_4$ (cochromite) nano-islands are grown epitaxially by radio-frequency magnetron sputtering. The fabrication of this device comprises epitaxial growth and the introduction of macroscopically or microscopically visible markers parallel to <110> directions that are perpendicular to the wafer normal by employing standard X-ray crystallographic or electron backscatter diffraction determination of these directions and their marking by suitable processes. Another of many examples of the second type of device is a wafer of (100) oriented $MgAl_2O_4$ (spinel) on which a strain symmetrized superlattice of $CoCr_2O_4$ (cochromite) and a suitable spinel structure spacer layer material are grown epitaxially by radio-frequency magnetron sputtering whereby the superlattice ends in $CoCr_2O_4$ (cochromite) nano-islands. The fabrication of this device comprises epitaxial growth and the introduction of macroscopically or microscopically visible markers parallel to <110> directions that are perpendicular to the wafer normal by employing standard X-ray crystallographic or electron backscatter diffraction determination of these directions and their marking by suitable processes.

For microscope calibration, the nano-islands of the second type of this nanometrology device standard are aligned with their <110> edges (the intersections of the nano-island facets with the $MgAl_2O_4$ wafer normal) to be perpendicular to the probe tip scanning direction. This is achieved by taking advantage of the macroscopically or microscopically visible <110> directions. For the calibration of a scanning probe microscope with the second type of this nanometrology device standard, the scanning probe tip follows <110> directions. This means that the scanning probe tip goes up a nano-island (111), (1-11), (-1-11), or (-111) plane. Then the scanning probe tip goes down a nano-island (-1-11), (-111), (111), or (1-11) plane. Each of these planes makes an angle of 54.736° with the (001) surface normal. The four-fold symmetry of the nano-island is taken advantage of for the calibration of scanning probe microscopes by adjusting each one of the above mentioned <110> directions to be perpendicular to the scanning probe direction, one after the other, repeating the calibration procedure four times, and averaging the results.

One of many examples of the third type of the device is a wafer of (111) oriented $BaF_2$ (frankdicksonite) on which PbTe (altaite) nano-islands are grown epitaxially in the Volmer-Weber mode using molecular beam epitaxy. The process of the fabrication of this device comprises epitaxial growth and the introduction of macroscopically or microscopically visible edges parallel to <110> directions that are perpendicular to the wafer normal by partial or total cleaving of the pseudo-substrate while taking advantage of the three naturally occurring {111} cleavage planes that are inclined by 70.529° to the (111) $BaF_2$ plane.

For microscope calibration, the nano-islands of this nanometrology device standard are aligned with their <110> edges (the intersections of the nano-island facets with the $BaF_2$ wafer normal) to be perpendicular to the probe tip scanning direction. This is achieved by taking advantage of the macroscopically or microscopically visible <110> directions. When the scanning probe tip scans over such a nano-island, it follows a [2-1-1], [1-21] of [11-2] direction. First the scanning probe tip goes up a nano-island (211), (121), or (112) plane. Each of these planes makes an angle of 19.471° with the (111) surface normal. Then the scanning probe tip goes down a nano-island [-311], [1-31], or [11-3] edge. Each of these edges makes an angle of 10.025° with the (111) surface normal. The three-fold symmetry of the nano-island is taken advantage of for the calibration of scanning probe microscopes by adjusting each one of the above mentioned <110> directions to be perpendicular to the scanning probe direction, one after the other, repeating the calibration procedure three times, and averaging the results.

EXAMPLE 1

PbSe (clausthalite) or Pb(Se,Te) islands with a high PbSe content can be grown on PbTe (altaite) by molecular bean epitaxy using PbTe and PbSe sources. (111) oriented silicon can be used as a substrate. After desorption of surface layers, a 20 nm thick $CaF_2$ (fluorite) buffer layer is grown at 700° C. Subsequently, at 350° C., a 5 µm thick PbTe buffer layer is grown. The substrate and layers are then exposed to a 380 C environment, and 1.5 nm (approximately 5 monolayers) of PbSe is deposited at a rate of 0.25 nm s$^{-1}$. The sample is cooled to room temperature at a rate of 1 K s$^{-1}$, and removed from the epitaxial growth reactor. Crystallographic <112> directions that are perpendicular to the Si wafer substrate normal are marked by partial or total cleavage of the epitaxial structure along the {110} planes that are perpendicular to the Si wafer normal.

Figure 13:
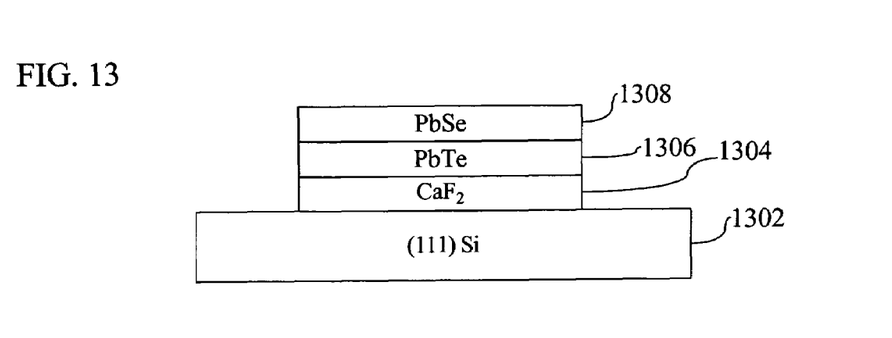
FIGS. 13-16 are schematic diagrams of representative nano-island metrology standards.

A simplified representation of such a device is shown in FIG. 13. A (111) oriented silicon substrate 1302 is provided with a $CaF_2$ layer 1304 and a PbTe layer 1306, respectively. A PbSe layer 1308 is then provided, and nano-islands self-assemble in this layer. In typical examples, a thickness of the $CaF_2$ layer 1304 is between about 1 nm and 100 nm, and a thickness of the PbTe layer 1306 is between about 1 µm and 10 µm. Target thickness for the PbSe layer 1308 is typically between about 0.5 nm and 5 nm.

EXAMPLE 2

PbSe (clausthalite) or Pb(Se,Te) islands with a high PbSe content are grown on PbTe (altaite) using molecular bean epitaxy with PbTe and PbSe sources. (111) oriented silicon is the substrate. After desorption of surface layers, a 3 nm thick $CaF_2$ (fluorite) buffer layer is grown at 700° C. Subsequently, a 4 µm thick PbTe buffer layer is grown at 350° C. The assembly is then exposed to a 380° C. environment and 1.1 nm (about 3.5 monolayers) of PbSe is deposited at a rate of about 0.25 nm s$^{-1}$. The assembly is then cooled to room temperature at a rate of 1 K s$^{-1}$ and removed from the epitaxial growth reactor. Crystallographic <112> directions perpendicular to the Si wafer normal are marked by partial or total cleavage of the epitaxial structure along the {110} planes that are perpendicular to the Si wafer normal.

EXAMPLE 3

PbSe (clausthalite) or Pb(Se,Te) islands with a high PbSe content can be grown on PbTe (altaite) by molecular bean epitaxy using PbTe and PbSe sources. (111) oriented silicon can be used as a substrate. After desorption of surface layers, a 25 nm thick $CaF_2$ (fluorite) buffer layer can be grown at 700° C. At the same temperature, a $BaF_2$ (frankdicksonite) buffer layer with 1 µm thickness is grown. Subsequently at 350° C., a 4 nm thick PbTe buffer layer is grown. The assembly is then heated to about 380° C. and 1.1 nm (approximately 3.5 monolayers) of PbSe is deposited at a rate of 0.25 nm s$^{-1}$. The assembly is cooled to room temperature at a rate of 1 K s$^{-1}$ and removed from the epitaxial growth reactor. Crystallographic <112> directions that are perpendicular to the Si wafer normal are marked by partial or total cleavage of the epitaxial structure along the {110} planes that are perpendicular to the Si wafer normal.

EXAMPLE 4

$CoCr_2O_4$ (cochromite) can be grown on (001) oriented $MgAl_2O_4$ (spinel) by radio-frequency magnetron sputtering at a temperature of about 700° C. in an atmosphere of 75% Ar and 25% $O_2$ at a pressure of 33.33 Pa and a growth rate of approximately 0.03 nm s$^{-1}$. Sputtering for 50 minutes results in a $CoCr_2O_4$ layer that is approximately 85 nm thick. After sputtering, the sample is cooled to room temperature and removed from the growth chamber. Crystallographic <110> directions that are perpendicular to the $MgAl_2O_4$ wafer normal are determined by standard X-ray crystallography or electron backscattering diffraction in a scanning electron microscope and marked on the device surface.

Figure 14:
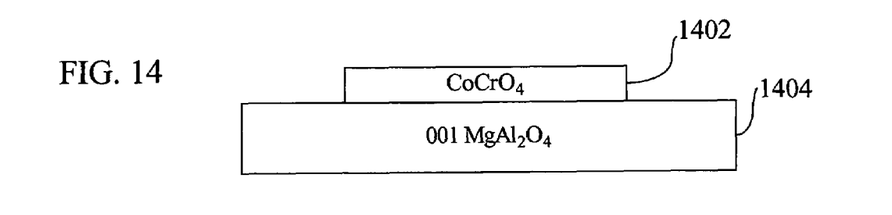

A simplified representation of such a device is illustrated in FIG. 14. A $CoCr_2O_4$ layer 1402 is formed on a (001) oriented $MgAl_2O_4$ substrate 1404. A thickness of the $CoCr_2O_4$ layer 1402 is typically between about 10 nm and 500 mm. Nano-islands self assemble in the layer 1402, but these nano-islands are not shown in FIG. 14.

EXAMPLE 5

$CoCr_2O_4$ (cochromite) can be grown on (001) oriented $MgAl_2O_4$ (spinel) by radio-frequency magnetron sputtering at a temperature of 700° C. in an atmosphere of 75% Ar and 25% $O_2$ at a pressure of 33.33 Pa and a growth rate of approximately 0.03 nm s$^{-1}$. Sputtering for 100 minutes results in a $CoCr_2O_4$ layer that is approximately 170 nm thick. The sample is then cooled to room temperature and removed from the sputtering chamber. Crystallographic <110> directions that are perpendicular to the $MgAl_2O_4$ wafer normal are determined by standard X-ray crystallography or electron backscattering diffraction in a scanning electron microscope and marked on the device surface.

EXAMPLE 6

$CoCr_2O_4$ (cochromite) is grown on (001) oriented $MgAl_2O_4$ (spinel) by radio-frequency magnetron sputtering at a temperature of 700° C. in an atmosphere of 75% Ar and 25% $O_2$ at a pressure of 33.33 Pa at a growth rate of approximately 0.03 nm s$^{-1}$. Sputtering for 200 minutes results in a $CoCr_2O_4$ layer that is approximately 340 nm thick. The assembly is then cooled to room temperature and removed from the epitaxial growth reactor. Crystallographic <110> directions that are perpendicular to the $MgAl_2O_4$ wafer normal are determined by standard X-ray crystallography or electron backscattering diffraction in a scanning electron microscope and marked on the device surface.

EXAMPLE 7

PbSe (clausthalite) or Pb(Se,Te) islands with a high PbSe content can be grown on PbTe (altaite) by molecular bean epitaxy using PbTe and PbSe sources. Freshly cleaved (111) oriented $BaF_2$ (frankdicksonite) can be used as the substrate. After desorption of surface layers for 10 minutes at 500° C., a 3 µm PbTe is grown at a rate of 0.2 nm s$^{-1}$. Then the temperature is lowered to 380° C. and 2.5 nm (approximately 8 monolayers) of PbSe are deposited at a rate of 0.08 nm s$^{-1}$. The assembly is finally cooled to room temperature by disabling the molecular beam epitaxy system sample heaters. The sample is removed from the epitaxial growth reactor and the crystallographic <110> directions that are perpendicular to the $BaF_2$ wafer normal are marked by partial or total cleavage of the epitaxial structure along the {111} planes that are inclined by 70.529° to the (111) wafer normal plane.

Figure 15:
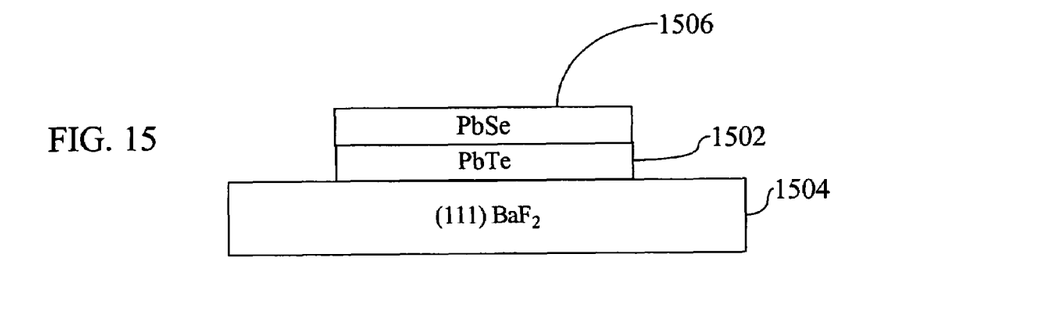

A simplified representative example of such a device is illustrated schematically in FIG. 15. A PbTe layer 1502 is situated on a (111) oriented $BaF_2$ substrate 1504. A PbSe layer 1506 is configured for nano-island self-assembly. A thickness of the PbTe layer 1502 is typically between 0.5 µm and 5 µm, and a thickness of the PbSe layer 1502 is selected to be between 1 nm and 10 nm.

EXAMPLE 8

PbSe (clausthalite) or Pb(Se,Te) islands with a high PbSe content can be grown on PbTe (altaite) by molecular bean epitaxy using PbTe and PbSe sources. Freshly cleaved (111) oriented $BaF_2$ (frankdicksonite) is used as the substrate. After desorption of surface layers for 15 minutes at 500° C., a PbTe buffer layer is grown at 400° C. and a growth rate of 0.2 nm s$^{-1}$. Then 50 periods of a PbSe nano-island layer plus a strain symmetrizing (Pb,Eu)Te spacer layer are grown at 360° C. A 1.5 nm thick PbSe layer (approximately 5 monolayers) is deposited at a rate of 0.025 nm s$^{-1}$ and a 16 nm thick $Pb_{0.92}Eu_{0.8}Te$ layer is deposited at a growth rate of 0.35 nm s$^{-1}$ for one period of this superlattice. The sample is cooled to room temperature at a rate of 1 K s$^{-1}$ and removed from the epitaxial growth reactor. Crystallographic <110> directions that are perpendicular to the $BaF_2$ wafer normal are marked by partial or total cleavage of the epitaxial structure along the {111} planes that are inclined by 70.529° to the (111) wafer normal plane.

Figure 16:
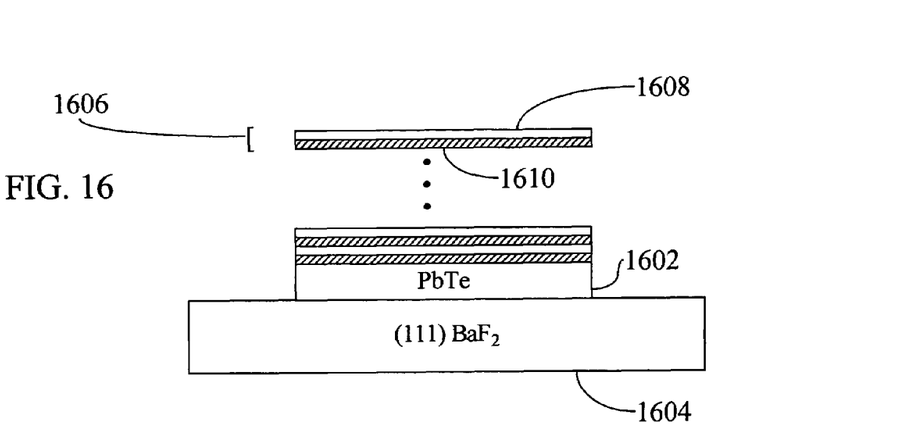

A simplified representative device configuration is illustrated in FIG. 16. A PbTe layer 1602 is situated on a (111) oriented BaF$_2$ substrate 1604. A plurality of layer pairs 1606 are provided, each layer pair 1606 including a PbSe layer 1608 and a spacer layer 1610.

EXAMPLE 9

PbSe (clausthalite) or Pb(Se,Te) islands with a high PbSe content can be grown on PbTe (altaite) by molecular bean epitaxy using PbTe and PbSe sources. Freshly cleaved (111) oriented BaF$_2$ (frankdicksonite) can be used as the substrate. After desorption of surface layers for 15 minutes at 500° C., a PbTe buffer layer is grown at 400° C. and a growth rate of 0.2 nm s$^{-1}$. Then 50 periods of a PbSe nano-island plus a strain symmetrizing (Pb,Eu)Te spacer layer are grown at 360° C. In this example, 1.5 nm (approximately 5 monolayers) of PbSe is deposited at a rate of 0.025 nm s$^{-1}$ and 46.5 nm of Pb$_{0.92}$Eu$_{0.8}$Te is grown at a rate of 0.35 nm s$^{-1}$ for one period of this superlattice. The sample is finally cooled to room temperature at a rate of 1 K s$^{-1}$ and removed from the epitaxial growth reactor. Crystallographic <110> directions that are perpendicular to the BaF$_2$ wafer normal are marked by partial or total cleavage of the epitaxial structure along the {111} planes that are inclined by 70.529° to the (111) wafer normal plane.

EXAMPLE 10

PbTe (altaite) can be grown by molecular bean epitaxy using a PbTe source. Freshly cleaved (111) oriented BaF$_2$ (frankdicksonite) is used as a substrate. After desorption of surface layers for 15 minutes at 500° C., the substrate temperature is lowered to 300° C. and 0.475 nm (approximately 1.5 monolayers) of PbTe is deposited at a rate of 0.15 nm s$^{-1}$. The assembly is then cooled to room temperature at a rate of 1 K s$^{-1}$ and removed from the epitaxial growth reactor. Crystallographic <110> directions that are perpendicular to the BaF$_2$ wafer normal are marked by partial or total cleavage of the epitaxial structure along the {111} planes that are inclined by 70.529° to the (111) wafer normal plane.

EXAMPLE 11

Figure 17:
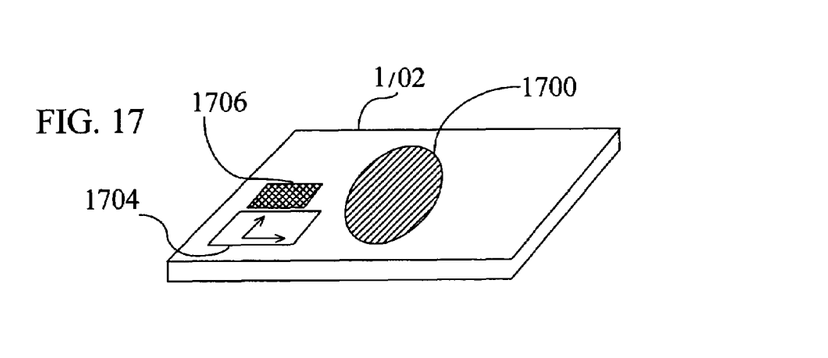
FIG. 17 is a perspective view of a representative nano-island metrology standard.

PbTe (altaite) can be grown by molecular bean epitaxy using a PbTe source. Freshly cleaved, (111) oriented BaF$_2$ (frankdicksonite) can be used as the substrate. After desorption of surface layers by exposure to a 500° C. environment for about 15 minute, the substrate temperature is reduced to about 300° C. and 1.9 nm (approximately 6 monolayers) of PbTe is deposited at a rate of 0.15 nm s$^{-5}$. The sample is then cooled at a rate of 1 K s$^{-1}$ and removed from the epitaxial growth reactor. Crystallographic <110> directions that are perpendicular to the BaF$_2$ wafer normal are marked by partial or total cleavage of the epitaxial structure along the {111} planes that are inclined by 70.529° to the (111) wafer normal plane FIG. 17 illustrates a simplified representative metrology standard. A nano-island region 1700 is situated on a substrate 1702. Indicia regions 1704, 1706 can be provided for indication of nano-island crystallographic directions, nano-island hardness, material, size distribution, or other characteristic. Such regions can be situated within the nano-island region or at other convenient location.

Nanometrology device standards can be based on the representative structures described above. Methods for fabricating and using such devices in conjunction with scanning probe microscopes typically include (1) epitaxial growth by any method that results in nanometer sized islands, and (2) marking of suitable crystallographic directions on the device by any method so that scans in a range of suitable crystallographic directions can be performed for calibration purposes.

In some examples, nanometrology device standards and methods for fabricating and using such devices in conjunction with scanning probe microscopes are based on epitaxial growth of nano-islands of a known morphology, structural and chemical stability in typical nanometrology laboratory environments, morphological stability of the crystal form in typical nanometrology laboratory environments, nearly complete morphological uniformity regardless of the nano-islands height, large height-to-width nano-island aspect ratios, either a small or a large nano-island size distribution, and a hardness range that allows for a multitude of calibrations of scanning probe microscopes with different scanning tips.

Examples of nanometrology device standards and methods for fabricating and using such devices in conjunction with scanning probe microscopes are described above. Standards can be provided with indicia that identify calibration directions or dimensions that are associated with, for example, crystallographic directions. Calibration directions can be identified based on nano-island or substrate cleavage (or partial cleavage) or by X-ray diffraction or electron backscatter diffraction. Directions and dimensions are conveniently included in such indicia. In some examples, device standards include nano-islands or other structures associated with one or more feature populations, such as size, orientation, shape, or other structural features. These additional features can also be noted in any indicia.

Nano-islands of various sizes can be included in calibration standards, and islands of larger or smaller sizes can be used. As used herein, nano-islands have dimensions of from about 0.5 nm to about 500 nm. Nano-islands or crystal islands can be formed within a layer so as to project outwardly from a layer of nano-island material. Alternatively, a nano-island material can be deposited so that substantially separate nano-islands are formed directly on a substrate. Thus, nano-islands or other islands can project from a substrate, a buffer or stress/strain compensating layer, or out of a layer of a material from which nano-islands are formed.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A calibration standard, comprising:
   a substrate;
   at least one nano-island situated at a surface of the substrate; and
   an indicia associated with a crystallographic orientation of the at least one nano-island, wherein the indicia is fixed with respect to the nano-island.

2. The calibration standard of claim 1, wherein the indicia is situated on the substrate.

3. The calibration standard of claim 1, wherein the indicia is situated on the at least one nano-island.

4. The calibration standard of claim 1, further comprising a plurality of nano-islands.

5. The calibration standard of claim 1, wherein the indicia is a cleavage plane of the substrate.

6. The calibration standard of claim 1, wherein the indicia is a cleavage plane of the nano-island.

7. The calibration standard of claim 1, wherein the substrate is (111) oriented silicon.

8. The calibration standard of claim 1, wherein the substrate is (111) oriented $BaF_2$.

9. The calibration standard of claim 8, further comprising a layer situated between the substrate and the at least one nano-island.

10. The calibration standard of claim 9, wherein the nano-island has dimensions of between about 1 nm and 20 nm.

11. A method of fabricating a calibration standard, comprising:
   forming at least one nano-island at a surface of a substrate; and
   providing an indicia of a crystallographic orientation of the nano-island, wherein the indicia is fixed with respect to the nano-island.

12. The method of claim 11, wherein the indicia is provided by cleaving at least one of the substrate and the nano-island.

13. The method of claim 11, wherein the indicia is provided based on X-ray diffraction analysis of the nano-island.

14. The method of claim 11, wherein the indicia is provided based on electron backscatter diffraction analysis.

15. The method of claim 11, further comprising forming the at least one nano-island by epitaxial growth.

16. The method of claim 11, wherein the nano-island has dimensions between about 1 nm and about 10 nm.

17. The method of claim 11, further comprising forming a plurality of nano-islands at the surface of the substrate.

* * * * *

UNITED STATES PATENT AND TRADEMARK OFFICE
CERTIFICATE OF CORRECTION

PATENT NO. : 7,472,576 B1  Page 1 of 1
APPLICATION NO. : 11/282395
DATED : January 6, 2009
INVENTOR(S) : Peter Moeck It is certified that error appears in the above-identified patent and that said Letters Patent is hereby corrected as shown below:

In the Drawings:

Sheet 6, FIG. 17, "1/02" should read --1702--

Column 4, line 3, "approximately/2" should read --approximately $\sqrt{2}$ --

Column 7, line 29, "arccos(2/" should read -- $\arccos(4/$ --

Column 11, line 30, "a 4 nm thick" should read --4 μm thick--

Column 11, line 57, "500 mm" should read --500 nm--

Column 13, line 51, "0.15 nm s$^{-5}$" should read --0.15 nm s$^{-1}$--

Signed and Sealed this

Seventh Day of December, 2010

David J. Kappos
*Director of the United States Patent and Trademark Office*